United States Patent Office 2,920,937
Patented Jan. 12, 1960

2,920,937

ANTICAKING AGENTS

Robert R. Burns, Naperville, Ill., assignor to Nalco Chemical Company, Chicago, Ill., a corporation of Delaware No Drawing. Application September 26, 1957
Serial No. 686,289

9 Claims. (Cl. 23—59)

This invention relates to hygroscopic finely divided solids which have been rendered non-caking as the result of being treated with certain organic chemicals. Specifically, it relates to non-caking inorganic fertilizers and to their method of production.

Many chemical substances tend to stick or cake as the result of moisture being in contact with such substances. Many inorganic substances such as salts absorb moisture from the atmosphere and form lumpy agglomerates which make it necessary to break up such substances so that they may be poured, mixed or distributed. A particularly troublesome caking problem is found in the manufacture and use of ammonium nitrate and ammonium sulfate fertilizers. A common chemical substance, borax, which has many industrial and domestic uses, will tend to cake upon exposure to moisture, thus making its handling difficult and troublesome.

There have been many attempts to treat hygroscopic substances in an effort to reduce their caking tendencies, but for the most part such processes have not been entirely successful.

It would be desirable if a chemical treatment were available which would be effective at low dosages and would make a large number of substances non-caking.

It, therefore, becomes an object of the invention to provide a chemical substance which is useful in rendering a large number of finely divided hygroscopic materials non-caking.

A specific object is to provide a chemical treatment for ammonium nitrate, ammonium sulfate and borax which when used in small amounts will render such non-caking in the presence of moisture. Other objects will appear hereinafter.

In accordance with the invention, it has been found that the large number of inorganic, hygroscopic finely divided solid substances which normally tend to cake in the presence of moisture may be treated with from 0.001 to 10% by weight of a specific class of 1,2-substituted imidazolinium salts whereby the caking tendencies of such substances are substantially reduced. The 1,2-substituted imidazolinium salts which are useful as anti-caking agents may be defined by the structures:

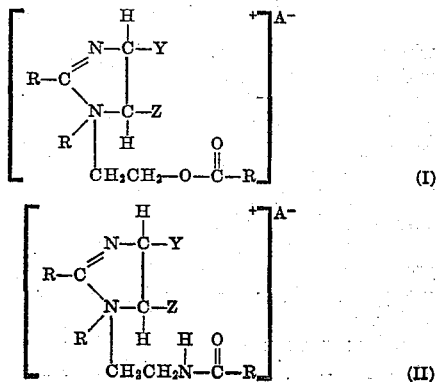

In these structures Y and Z may be either hydrogen or lower alkyl groups containing not more than six carbon atoms. A is an anion, either organic or inorganic, and will most usually be halides. The R radicals are of two different types. In one case R can represent a saturated aliphatic radical containing from 11 to 21 carbon atoms in chain length. Most preferably it will have 17 to 21 carbon atoms. Often it will represent a mixed saturated radical which is derived from hydrogenated fats and oils. In the second case R can represent a lower saturated aliphatic radical of 1 to 4 carbon atoms in chain length. To be operative, two occurrences of R must be higher aliphatic groups of the types described.

A preferred group of 1,2-substituted imidazolinium salts of the above type have the formula:

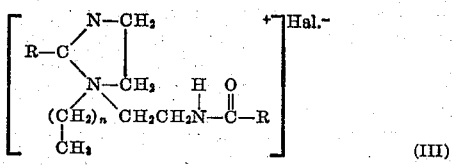

In this formula R is a saturated aliphatic radical containing from 17 to 21 carbon atoms in chain length. Hal. represents halide and $n$ is a small whole number from zero to three in value.

The starting 1,2-substituted imidazolines from which the imidazolinium salts are prepared are conveniently formed by reacting a saturated aliphatic carboxylic acid with an appropriate alkylene polyamine or substituted alkylene polyamine. The two alkylene polyamines most conveniently used are aminoethyl ethanolamine and diethylene triamine. Preparative techniques which may be used are disclosed in Wilson, U.S. Patent 2,267,965, the disclosure of which is incorporated herein by reference. A more complete treatment of the chemistry of the 1,2-substituted imidazolines appears in Chemical Reviews, vol. 54, No. 4, August (1954), under the title "The Chemistry of the 2-Imidazolines and Imidazolidines" by R. J. Ferm and J. L. Riebsomer. The additional alkyl groups are placed on the imidazoline ring by esterification or acylation methods, and quaternization is accomplished using conventional alkylating techniques.

For purposes of illustration, the following typical 1,2-substituted imidazolinium salts are presented. Since the nomenclature is complex and substitutents are derived from mixed materials such as hydrogenated oils and fats, class names and derivative acid names are sometimes used.

COMPOSITION I 1-(2-stearamidoethyl)-1-methyl-2-heptadecyl imidazolinium chloride was prepared by heating the diamide of diethylene triamine and stearic acid to form an imidazoline. This imidazoline was then quaternized with methyl chloride.

COMPOSITION II 1-(2-hydroxyethyl stearate)-1-ethyl-2-hydrogenated tallow imidazolinium bromide was prepared by esterifying 1-(2-hydroxyethyl)-2-hydrogenated tallow imidazoline with stearic acid and then alkylating with ethyl bromide.

COMPOSITION III 1-(2-acetamidoethyl)-1-lauryl-2-heptadecyl imidazolinium bromide was prepared from 1-(2-aminoethyl)-2-heptadecyl imidazoline which was then acylated with acetic acid and then alkylated with lauryl bromide.

COMPOSITION IV

A portion of each of the 1,2-substituted imidazolinium salts shown in Compositions I–III was slurried into isopropanol to form a series of 3% suspensions. The suspensions were then contacted with a strong base anion exchanger (Nalcite SBR), which was in the nitrite form. The imidazolinium nitrites thus produced were concentrated by evaporation of the isopropanol.

All of the above compositions were wax-like solids at room temperature but could be made liquid by gentle heating. The 1,2-substituted imidazolinium salts may be slurried in water or alcohol which slurry is then mixed with the substances to be treated until a uniform coating of the solution is placed upon the material. This type of application is particularly useful in treating ammonium nitrate and ammonium sulfate fertilizers, including mixtures thereof.

When the substance to be rendered non-caking is a salt that is not readily soluble or only slowly soluble in water, treatment can be accomplished by slurrying in water the 1,2-substituted imidazolinium salt and the slightly soluble inorganic salt and allowing the salt so treated to settle from suspension whereby it is subsequently filtered and dried. This type of treatment is particularly useful in treating such substances as borax.

While from 0.001 to 10% by weight of the 1,2-substituted imidazolinium salts may be used to achieve purposes of the invention, it should be understood that the amount necessary to render a given substance non-caking will depend upon several factors and the particular amount necessary to render a specific substance non-caking must be determined by routine experimentation. To further illustrate the invention, the following is given by way of example.

Example I

Fifty grams of commercial borax were slurried into 100 milliliters of tap water. Composition I was melted and was slurried into the borax suspension at a dosage of 0.5 part per 2000 parts of borax. In the same fashion slurries of borax were treated to give dosages of Composition I at 1 and 75 parts per 2000 parts of borax. The slurries thus treated were mixed for thirty minutes, filtered and dried in a vacuum desiccator. The dried products were then placed in open Petri dishes and were allowed to stand in a humid room for 24 hours. At the end of this time, examination was made of the treated samples and it was found that all of the products so treated were free-flowing and showed no signs of caking. An untreated sample of the borax which was allowed to stand in a humid room for 24 hours was so caked that it was necessary to break up the lumps with a mortar and pestle.

Example II

Samples of ammonium nitrate and ammonium sulfate were treated with 0.3% by weight of Composition I. The treatment was accomplished by melting Composition I and molding it into the salts. The treated materials were then allowed to stand in a humid room for several hours. These treated materials were completely free-flowing and evidenced no signs of caking. Untreated samples exposed to the atmosphere for several hours were caked and could not be poured from their containers.

The pentavalent nitrogen in the 1,2-substituted imidazolinium salts has been shown as being on the 1-nitrogen atom in the heterocyclic structure. If it occurs on the 3-nitrogen atom, then such is deemed as equivalent for the purposes and practices of this invention.

The invention has utility in rendering non-caking such chemicals as sodium chloride, potassium chloride, calcium and sodium carbonate, sodium acetate, sodium nitrate and magnesium sulfate.

The invention is hereby claimed as follows:

1. Borax which has been treated with from 0.001% to 10% by weight of a 1,2-substituted imidazolinium salt of the formula from the group consisting of

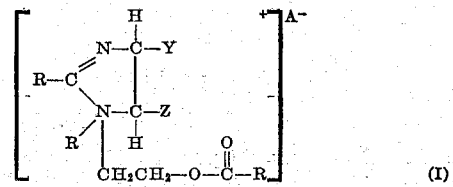

(I)

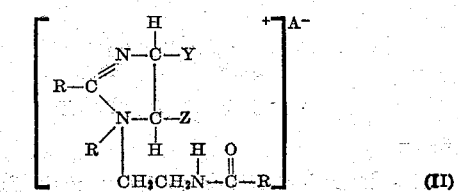

(II)

where Y and Z are from the group consisting of hydrogen and lower alkyl groups containing not more than six carbon atoms, A is an anion and R is a saturated aliphatic radical from the group consisting of (A) radicals containing from one to four atoms in chain length and (B) radicals containing from eleven to twenty-one carbon atoms in chain length, with the proviso that two occurrences of R are (B).

2. Borax which has been treated with from 0.001% to 10% by weight of a 1,2-substituted imidazolinium salt of the formula:

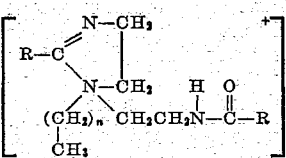

where R is a saturated aliphatic radical containing from seventeen to twenty-one carbon atoms in chain length; $n$ is a number from zero to three and hal. is halide.

3. The process of producing a non-caking inorganic hygroscopic finely divided solid which comprises intimately admixing therewith from 0.001% to 10% by weight of a 1,2-substituted imidazolinium salt of the formula from the group consisting of

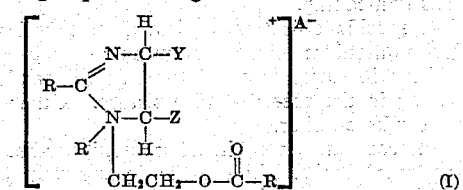

(I)

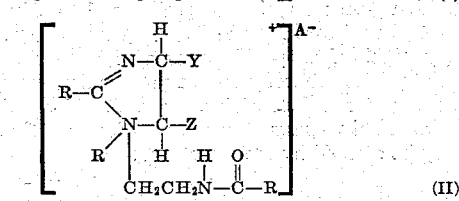

(II)

where Y and Z are from the group consisting of hydrogen and lower alkyl groups containing not more than six carbon atoms, A is an anion and R is a saturated aliphatic radical from the group consisting of (A) radicals containing from one to four atoms in chain length and (B) radicals containing from eleven to twenty-one carbon atoms in chain length, with the proviso that two occurrences of R are (B).

4. The process of claim 3 where the inorganic hygroscopic finely divided solid is a fertilizer from the group consisting of ammonium nitrate and ammonium sulfate.

5. The process of claim 3 where the inorganic hygroscopic finely divided solid is borax.

6. The process of producing a non-caking inorganic hygroscopic finely divided solid which comprises intimately admixing therewith from 0.001% to 10% by weight of a 1,2-substituted imidazolinium salt of the formula

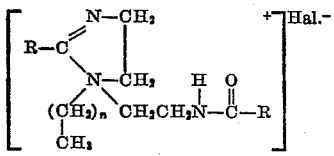

where R is a saturated aliphatic radical containing from 17 to 21 carbon atoms in chain length, $n$ is a number from zero to three and hal. is halide.

7. The process of claim 6 where the inorganic hygroscopic finely divided solid is at least one fertilizer from the group consisting of ammonium nitrate and ammonium sulfate.

8. The process of claim 6 where the inorganic hygroscopic finely divided solid is borax.

9. The process of rendering ammonium nitrate noncaking which comprises treating the ammonium nitrate with from 0.001 to 10% by weight of 1-(2-stearamidoethyl)-1-methyl-2-heptadecyl imidazolinium chloride.

References Cited in the file of this patent
UNITED STATES PATENTS

| | | |
|---|---|---|
| 2,399,987 | Cordie et al. | May 7, 1946 |
| 2,527,618 | Bozich | Oct. 31, 1950 |
| 2,702,747 | Studebaker | Feb. 22, 1955 |
| 2,738,325 | Rydell | Mar. 13, 1956 |
| 2,797,196 | Dunn et al. | June 25, 1957 |